United States Patent
Park et al.

(10) Patent No.: US 9,594,202 B2
(45) Date of Patent: Mar. 14, 2017

(54) BACKLIGHT UNIT AND DISPLAY DEVICE INCLUDING THE SAME

(71) Applicant: Samsung Display Co., Ltd., Yongin, Gyeonggi-Do (KR)

(72) Inventors: Chan Jae Park, Osan-si (KR); Seung Hwan Baek, Seoul (KR); Hwan Jun Sung, Seongnam-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 173 days.

(21) Appl. No.: 14/340,861

(22) Filed: Jul. 25, 2014

(65) Prior Publication Data

US 2015/0285981 A1     Oct. 8, 2015

(30) Foreign Application Priority Data

Apr. 2, 2014  (KR) ........................ 10-2014-0039408

(51) Int. Cl.
*G02F 1/1335* (2006.01)
*F21V 8/00* (2006.01)

(52) U.S. Cl.
CPC ......... *G02B 6/0025* (2013.01); *G02B 6/0026* (2013.01); *G02B 6/0031* (2013.01); *G02B 6/0068* (2013.01); *G02F 1/133605* (2013.01); *G02F 2001/133607* (2013.01); *G02F 2001/133614* (2013.01); *G02F 2202/36* (2013.01)

(58) Field of Classification Search
None
See application file for complete search history.

(56) References Cited

U.S. PATENT DOCUMENTS

| | | |
|---|---|---|
| 7,581,863 B2 | 9/2009 | Lester |
| 7,859,610 B2 | 12/2010 | Mizushima et al. |
| 8,206,020 B2 | 6/2012 | Nagata et al. |
| 8,451,398 B2 | 5/2013 | Mizuuchi et al. |
| 8,456,588 B2 | 6/2013 | Shikii et al. |
| 2008/0105887 A1* | 5/2008 | Narendran ............. B82Y 10/00 257/98 |

(Continued)

FOREIGN PATENT DOCUMENTS

JP      2013-044800 A      3/2013

*Primary Examiner* — Richard Kim
(74) *Attorney, Agent, or Firm* — Knobbe Martens Olson & Bear LLP

(57) ABSTRACT

A backlight device for use in a display device includes a light source device and a light diffusion member. The light source device includes a plurality of light sources. The light diffusion member includes a light transmission body and reflectors. The light transmission body includes a light receiving surface facing a first one of the light sources for receiving the light emitted from the first light source and a light output surface facing away from the light receiving surface for outputting the light transmitted through the light transmission body. The reflectors are attached to the light transmission body and include first and second reflection surfaces oriented such that the light received from the first light source through the light receiving surface is reflected by the first and second reflection surfaces while the light passes through the light transmission body toward the light output surface.

14 Claims, 27 Drawing Sheets

(56) References Cited

U.S. PATENT DOCUMENTS

| | | | |
|---|---|---|---|
| 2009/0296026 A1* | 12/2009 | Bae | G02B 6/008 349/65 |
| 2011/0199686 A1 | 8/2011 | Fujisawa | |
| 2013/0335678 A1* | 12/2013 | Syu | F21V 13/02 349/65 |

* cited by examiner

BACKLIGHT UNIT AND DISPLAY DEVICE INCLUDING THE SAME

CROSS-REFERENCE TO RELATED APPLICATIONS

This application is based on and claims priority from Korean Patent Application No. 10-2014-0039408, filed on Apr. 2, 2014 in the Korean Intellectual Property Office, the disclosure of which is incorporated herein in its entirety by reference.

BACKGROUND

1. Field

The present disclosure relates to a backlight unit and a display device including the same.

2. Description of the Prior Art

A display device is to visually display images. The display device may be a liquid crystal display, an electrophoretic display, an organic light emitting display, an inorganic electroluminescent (EL) display, a field emission display, a surface-conduction electron-emitter display, a plasma display, or a cathode ray display.

Some of the display devices, for example, liquid crystal displays require back light. In a liquid crystal display, a liquid crystal layer is arranged between two transparent substrates, and light transmission for each pixel is controlled according to driving of the liquid crystal layer to display a desired image.

Since liquid crystals themselves are unable to emit light in the liquid crystal display, a separate light source portion is installed in the liquid crystal display, and contrast is implemented by adjusting the strength of light that passes through liquid crystals installed in each pixel. Here, the backlight unit including a light source portion is an important component that determines picture quality, such as luminance and uniformity of the liquid crystal device. Recently, there has been an attempt to heighten color purity of light that is emitted from a light source portion, but in this case, color blurring is increased.

SUMMARY

Accordingly, one aspect of the present invention is to provide a backlight unit, which can favorably disperse light that is incident from a light source portion.

Another aspect of the present invention is to provide a display device, which can favorably disperse light that is incident from a light source portion.

One aspect of the invention provides a backlight device for use in a display device comprising: a light source device comprising a plurality of light sources spaced from each other, each of the plurality of light sources configured to emit light; and a light diffusion member comprising: a light transmission body comprising a light receiving surface facing a first one of the light sources for receiving the light emitted from the first light source and a light output surface facing away from the light receiving surface for outputting the light transmitted through the light transmission body, and a plurality of reflectors attached to the light transmission body and comprising first and second reflection surfaces oriented such that the light received from the first light source through the light receiving surface is reflected by the first and second reflection surfaces while the light passes through the light transmission body toward the light output surface.

In the foregoing backlight device, an angle between any one of the light receiving and output surfaces and any one of the first and second reflection surfaces may be about 30° to about 60°. The backlight device may further comprise a light guide plate comprising a side surface opposing the light output surface for receiving the light output from the light diffusion member, wherein the light diffusion member is located between the light source device and the light guide plate. The plurality of light sources may comprise a second light source immediately neighboring the first light source, wherein the light diffusion member comprises another light transmission body configured to transmit light emitted from the second light source, wherein the plurality of reflectors comprises a first reflector located between the light transmission body and the other light transmission body, and comprising the first reflection surface and a third reflection surface that are oriented such that the first reflection surface is configured to reflect the light emitted from the first light source and not to reflect the light emitted from the second light source, and that the third reflection surface is configured to reflect the light emitted from the second light source and not to reflect the light emitted from the first light source.

Another aspect of the invention provides a backlight unit comprising: a light source device comprising a plurality of light sources each of which is configured to emit light; and a light diffusion member positioned next to the light source device to diffuse or scatter the light emitted from the light source portion, wherein the light diffusion member comprises at least one reflector to change a light path of the light emitted from the light source device while the light passes through the light diffusion member.

In the foregoing backlight unit, the light diffusion member may comprise at least one selected from the group consisting of inorganic oxide, spun glass, mesh product, silk, gauze, and gelatin. The light diffusion member may comprise a plurality of light diffusion units each of which comprises the at least one reflector. The light diffusion unit may comprise a hexahedron shape having a rhomboid cross-section, and comprises a light incident surface and a light emission surface, wherein an acute angle formed on the rhomboid is in the range of about 30° to about 60°, wherein the light diffusion unit comprises at least two reflection surfaces provided by the at least one reflector. The at least one reflector may comprise at least one selected from the group consisting of a metal thin film, a Bragg mirror, and a reflection film. The at least one reflector may comprise a first reflector shared by two adjacent light diffusion units among the plurality of light diffusion units.

Still in the foregoing backlight unit, the light diffusion unit may comprise an octahedron shape having a cross-section that corresponds to a shape of two rhomboids connected together, and comprises a light incident surface and a light emission surface that are substantially parallel to each other, a first surface and a second surface extending in substantially parallel to each other and at an angle of about 30° to about 60° with respect to the light incident surface, a third surface and a fourth surface extending in substantially parallel to each other and at the angle of about 30° to about 60° with respect to the light emission surface, and a fifth surface and a sixth surface that are connected to the light incident surface, the light emission surface, and the first to fourth surfaces, wherein the first surface and the second surface meet the third surface and the fourth surface, respectively. At least the first to fourth surfaces of the light diffusion unit are reflection surfaces provided by the at least one reflector. The at least one reflector comprises a first reflector shared by the adjacent light diffusion units.

Yet in the foregoing backlight unit, each light diffusion unit may comprise a wavelength conversion member. The wavelength conversion member may comprise at least one selected from the group consisting of a quantum dot and a phosphor. The wavelength conversion member may comprise both a quantum dot and a phosphor. The light diffusion unit may comprise a wavelength conversion layer comprising the wavelength conversion member and positioned inside the light diffusion unit.

A further aspect of the invention provides a display device comprising: a display panel configured to display an image; and one of the foregoing backlight devices or units. In the foregoing display device, the light diffusion member may comprise a plurality of light diffusion units each of which includes the at least one reflector. The light diffusion member may comprise a wavelength conversion member embedded therein.

In one aspect of the present invention, a backlight unit may comprise a light source portion including a plurality of light sources emitting light, and a light diffusion member positioned on a light emission surface of the light source portion to diffuse or scatter the light emitted from the light source portion, wherein the light diffusion member includes a reflection portion provided therein to change a light path.

In another aspect of the present invention, a display device may comprise a display panel displaying an image, and a backlight unit providing light to the display panel, wherein the backlight unit includes a light source portion including a plurality of light sources emitting light that is provided to the display panel, and a light diffusion member positioned on a light emission surface of the light source portion to diffuse or scatter the light emitted from the light source portion and to change a light path therein.

According to the embodiments of the present invention, at least the following effects can be achieved.

That is, since the diffusion effect is increased through increase of internal light paths, stripe blurring that occurs due to hot spot or color mixing inferiority can be resolved.

The effects according to the present invention are not limited to the contents as exemplified above, but further various effects are included in the description.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS

Figure 1:
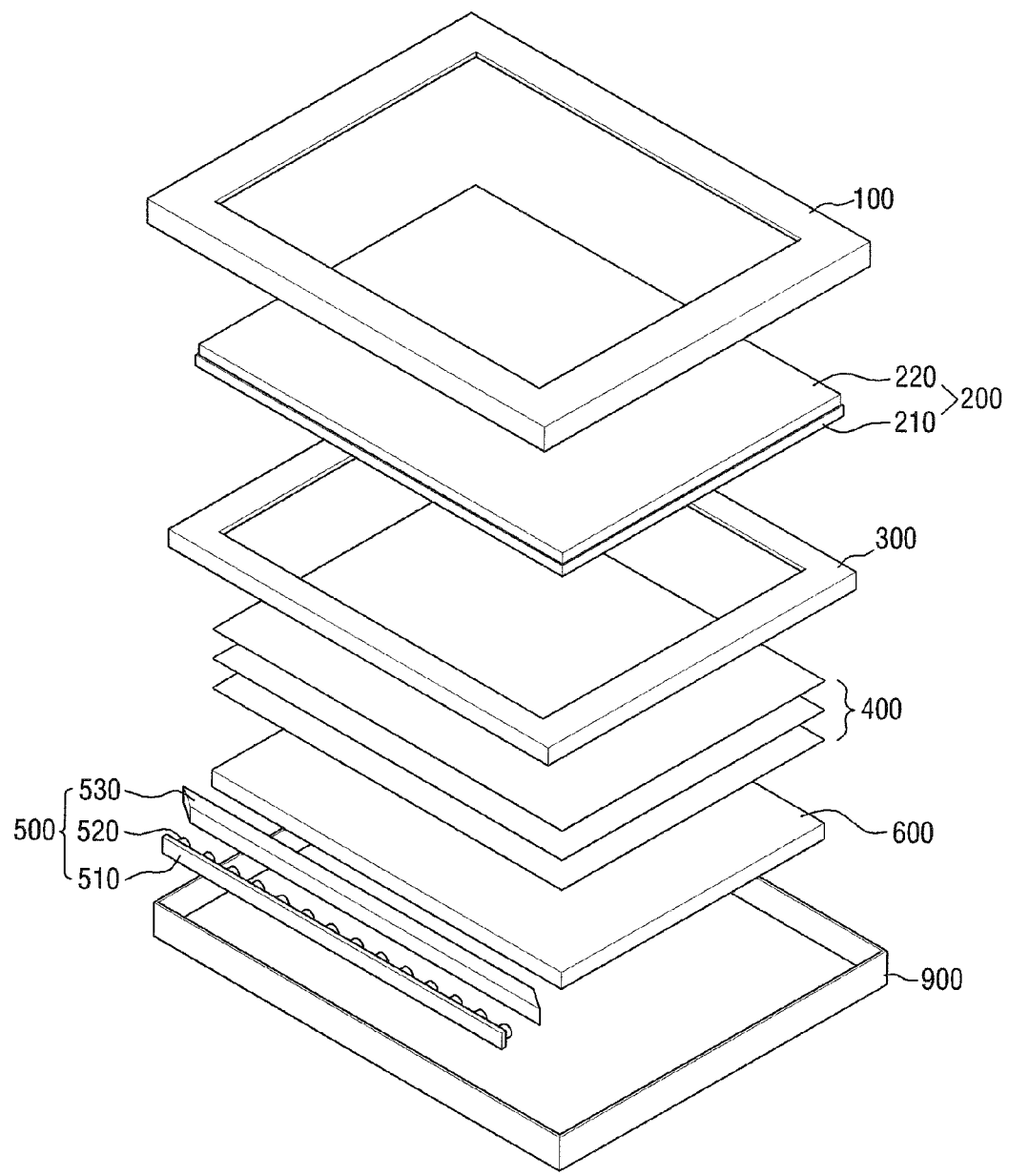
FIG. 1 is an exploded perspective view of a display device according to an embodiment of the present invention.

Advantages and features of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the present invention will be described with reference to the accompanying drawings.

Figure 2:
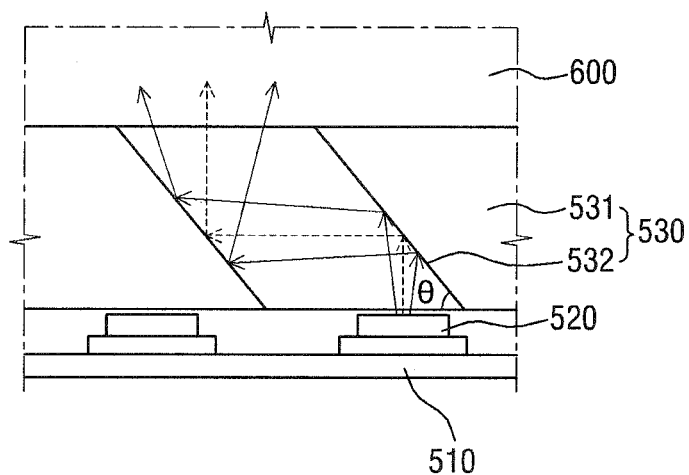
FIG. 2 is a partial enlarged view of a backlight unit of the display device of FIG. 1.

FIG. 1 is an exploded perspective view of a display device according to an embodiment of the present invention. FIG. 2 is a partial enlarged view of a backlight unit of the display device of FIG. 1, and FIG. 3 is a perspective view of a light diffusion unit of the backlight unit of FIG. 2.

Figure 3:
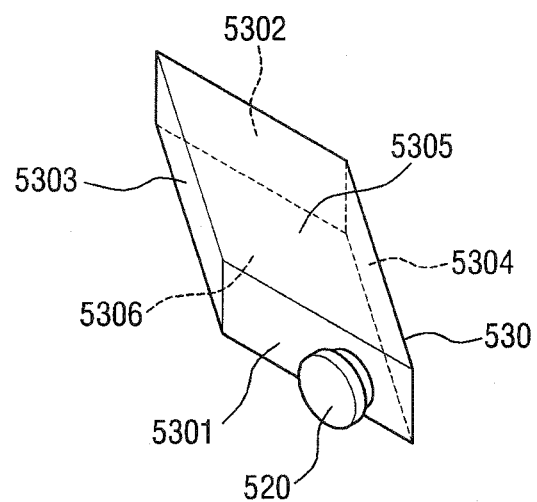
FIG. 3 is a perspective view of a light diffusion unit of the backlight unit of FIG. 2.

Referring to FIGS. 1 to 3, a display device according to an embodiment of the present invention includes a display panel 200 and a backlight device. Further, the display device according to an embodiment of the present invention may further include a top chassis 100 and a bottom chassis 900.

The display panel 200 is to display an image, and may be a liquid crystal display (LCD) panel, an electrophoretic display panel, an organic light emitting diode (OLED) panel, a light emitting diode (LED) panel, an inorganic electroluminescent (EL) display panel, a field emission display (FED) panel, a surface-conduction electron-emitter display (SED) panel, a plasma display panel (PDP), or a cathode ray tube (CRT) display panel. Hereinafter, as the display device according to an embodiment of the present invention, a liquid crystal display is exemplified. And as the display panel 200, an LCD panel is exemplified. However, the display device and the display panel 200 according to the present invention are not limited thereto, and various types of display devices and display panels may be used.

In embodiments, the display panel 200 may include a display region where an image is displayed and a non-display region where an image is not displayed. Further, the display panel 200 may include a first display substrate 210, a second display substrate 220 that faces the first display substrate 210, and a liquid crystal layer (not illustrated) interposed between the first display substrate 210 and the second display substrate 220.

The first display substrate 210 and the second display substrate 220 may be in a cuboidal shape. For convenience in explanation, FIG. 1 illustrates the first display substrate 210 and the second display substrate 220 in the cuboidal shape. However, the shapes of the first display substrate 210 and the second display substrate 220 are not limited thereto, but the first display substrate 210 and the second display substrate 220 may be manufactured in various shapes according to the shape of the display panel 200.

The liquid crystal layer may be interposed between the first display substrate 210 and the second display substrate 220. Further, between the first display substrate 210 and the second display substrate 220, a sealing member (not illustrated), such as a sealant, may be arranged along edge portions of the first display substrate 210 and the second display substrate 220 to attach and seal the first display substrate 210 and the second display substrate 220 together.

Although not illustrated in FIG. 1, in embodiments, the display panel 200 may include a driving portion and a flexible circuit board, which are attached to the first display substrate 210 or the second display substrate 220. The driving portion may generate and apply driving signals that are required to display an image on the display region to elements on the display region. The flexible circuit board may be connected to an external control device and a power to apply various kinds of external signals to the driving portion.

In the illustrated embodiments, the backlight device or assembly may be arranged under the display panel 200. The backlight device may provide light to the display panel 200. The backlight device according to an embodiment of the present invention includes a light source portion or device 510 and 520 and a light diffusion member or light diffuser 530. The backlight device further includes a light guide panel 600, an optical sheet 400, and a mold frame 300.

The backlight device according to an embodiment of the present invention may be an edge-illumination type backlight unit, and may include the light guide panel 600 that is positioned under the display panel 200.

In embodiments, the light source portion 510 and 520 may be formed to overlap the non-display region of the display panel 200, but not limited thereto. The light source portion 510 and 520 may generate light that is provided to the display panel 200.

The light source portion 510 and 520 may include a circuit board 510 and a plurality of light sources 520.

The circuit board 510 may be interposed between the light diffusion member 530 and a bottom chassis 900 to support the plurality of light sources 520 and to transfer voltages and various signals to the plurality of light sources 520. The circuit board 510 may be in a cuboidal plate shape, and may be connected to the flexible circuit board to receive a dimming signal from the driving portion.

The plurality of light sources 520 may be mounted on the circuit board 510 and spaced from each other. The plurality of light sources 520 may receive voltages from an outside and generate light that is transferred to the display panel 200.

In embodiments, the plurality of light sources 520 may be positioned on the same plane. In an exemplary embodiment, the plurality of light sources 520 may be positioned on a plane that is substantially parallel to a side surface of the light guide panel 600. The plurality of light sources 520 may be laser diodes or LEDs (Light Emitting Diodes), but are not limited thereto. The plurality of light sources 520 may mean all elements that can emit light.

In an exemplary embodiment, the plurality of light sources 520 may be mounted on one surface of the bar-shaped circuit board 510 that faces the light guide panel 600. The plurality of light sources 520 may be arranged in a line to be spaced apart from each other for a predetermined distance, but are not limited thereto.

Each of the plurality of light sources 520 may emit white light, or red, green, or blue light to be combined. Each of the plurality of light sources 520 may emit blue light. This will be described in detail with reference to other drawings.

The light diffusion member 530 may include light diffusion units each of which includes a light diffusion portion or light transmission body 531 and a reflection portion or reflector 532. The light diffusion member 530 may be configured so that each of the light diffusion units corresponds to one light source.

The light diffusion member 530 may have a cuboidal shape having a rhomboid cross-section, and include a light incident surface 5301, a light emission surface 5302 that is in substantially parallel to the light incident surface 5301, and four surfaces 5303, 5304, 5305, and 5306 that connect the light incident surface 5301 and the light emission surface 5302 to each other. In this case, the both side surfaces 5303 and 5304 may be formed to have a predetermined angle with respect to the light incident surface 5301 and the light emission surface 5302. The predetermined angle is not specially limited so far as it is in a range in which it makes light emitted to the light emission surface 5302 while changing a light path in the light diffusion member 530. In an exemplary embodiment, the angle may be in the range of about 30° to about 60°, but is not limited thereto.

The reflection portions 532 provide reflective surfaces. At the reflective surfaces, the light is reflected in the light diffusion member 530, and a path that passes through the light diffusion portion 531 is lengthened to improve diffusion effects.

In embodiments, the reflectors are embedded in the diffusion member. In embodiments, one reflection portion 532 may be shared by two adjacent units.

The light diffusion portion 531 may be made of any material that can diffuse or scatter the light. In an exemplary embodiment, the material of the light diffusion portion 531 may be at least one selected from the group including inorganic oxide, spun glass, mesh product, silk, gauze, and gelatin. In order to minimize a light loss, inorganic oxide having relatively prominent transparency may be used, but is not limited thereto. In an exemplary embodiment, the inorganic oxide may be silicon oxide or titanium oxide, but is not limited thereto.

The reflection portion 532 may be any material that can reflect light, and in order to maximize the effects of the present invention, the reflection portion 532 may be made of a material that can totally reflect the light. Examples of such reflection materials may be a metallic thin film, Brag mirror, and a reflection film, but are not limited thereto. The reflection portion 532 may be formed through deposition on the surface of the light diffusion portion 531 or through adhesion to the surface of the light diffusion portion 531. The method for forming the reflection portion 532 may be selectively adopted in consideration of the shape of the used material.

Through the use of the light diffusion member 530, the light that is generated from the light sources 520 does not directly reach the light guide panel 600. In embodiments, the light guide panel 600 and the light emission surface 5302 of the light diffusion member 530 come in contact with each other.

Further, since color blurring is prevented or inhibited from occurring in a relatively short length, the dead space can be reduced. The thickness of the light diffusion member 530 is not specially limited, but for the thin filing and miniaturization of the light diffusion member 530, the thickness thereof may be set to about 5 mm or less, but is not limited thereto.

In the illustrated embodiment, the light guide panel 600 may be positioned under the display panel 200. The light guide panel 600 may guide the light emitted from the light source portion 510 and 520 to transfer the guided light to the display panel 200.

The light guide panel 600 may be made of a transparent material. In an exemplary embodiment, the light guide panel 600 may be made of polymethyl methacrylate (PMMA), but is not limited thereto. The light guide panel 600 may be made of any material that can guide the light. Further, the light guide panel 600 may be made of a rigid material, but is not limited thereto. The light guide panel 600 may be made of a flexible material. Further, the light guide panel 600 may be in a cuboidal plate shape, but is not limited thereto. The light guide panel 600 may have various shapes.

The light source portion 510 and 520 may be positioned on one side of the light guide panel 600, but is not limited thereto. The light source portion 510 and 520 may be positioned on one side of the light guide panel 600 or on all sides of the light guide panel 600. The light source portion 510 and 520 may provide the light, which is to be transferred to the display panel 200, to the light guide panel 600.

The optical sheet 400 may be arranged over the light guide panel 600. Specifically, the optical sheet 400 may be arranged between the display panel 200 and the light guide panel 600. The optical sheet 400 may modulate the optical characteristics of the light that is emitted from the light source portion 500 and passes through the light guide panel 600. A plurality of optical sheets 400 may be provided to overlap each other. The plurality of optical sheets 400 may be stacked to supplement each other. For example, the optical sheets 400 may include a prism sheet and the like.

In an exemplary embodiment, the display device may further include a reflection plate (not illustrated). The reflection plate may be arranged on a lower side of the light guide panel 600. Specifically, the reflection plate may be interposed between the light guide panel 600 and the bottom chassis 900. The reflection plate may change a path of light, which is emitted from the backlight device and travels in the direction of the bottom chassis 900, to the direction of the light guide panel 600.

The mold frame 300 may be arranged between the display panel 200 and the optical sheet 400. The mold frame 300 is engaged with the bottom chassis 900 to fix the optical sheet 400, the light source portion 510 and 520, and the light guide panel 600. Further, the mold frame 300 may come in contact with an edge part of the display panel 200 to support and fix the display panel 200.

The top chassis 100 may cover the edge of the display panel 200, and surround the side surfaces of the display panel 200 and the backlight device. The bottom chassis 900 may accommodate the backlight device. The top chassis 100 and the bottom chassis 900 are engaged with each other to surround the display panel 200 and the backlight device. The top chassis 100 and the bottom chassis 900 may be made of a conductive material, for example, metal.

Figure 4:
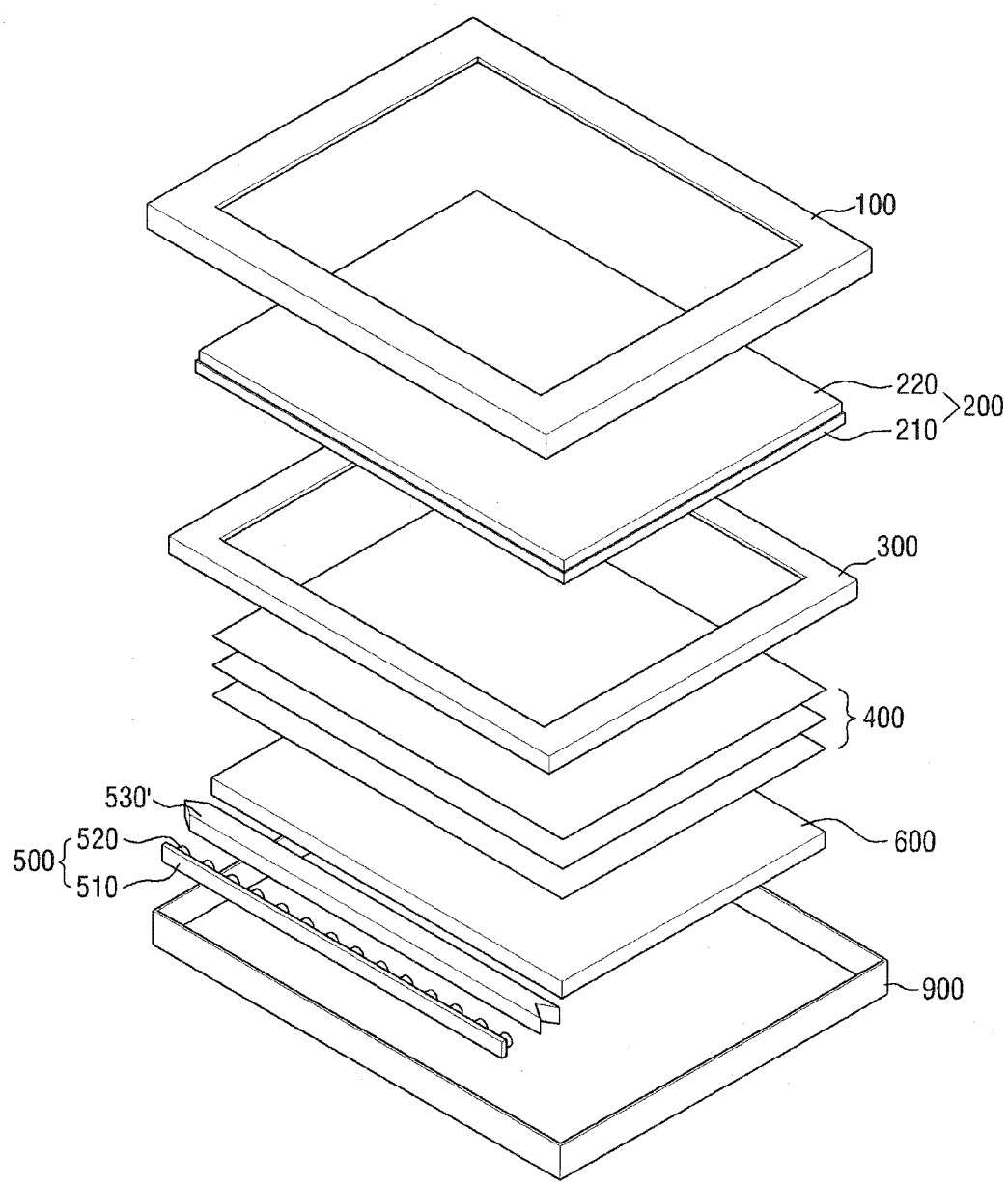
FIG. 4 is an exploded perspective view of a display device according to another embodiment of the present invention.
Figure 5:
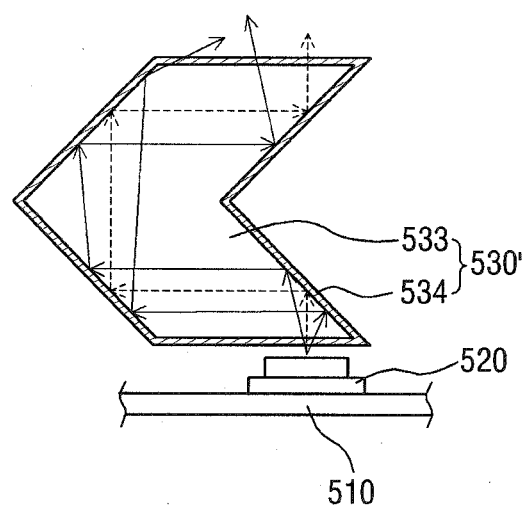
FIG. 5 is a partial enlarged view of a backlight unit of the display device of FIG. 4.

FIG. 4 is an exploded perspective view of a display device according to another embodiment of the present invention. FIG. 5 is a partial enlarged view of a backlight unit of the display device of FIG. 4, and FIG. 6 is a perspective view of a light diffusion unit of the backlight unit of FIG. 5.

Figure 6:
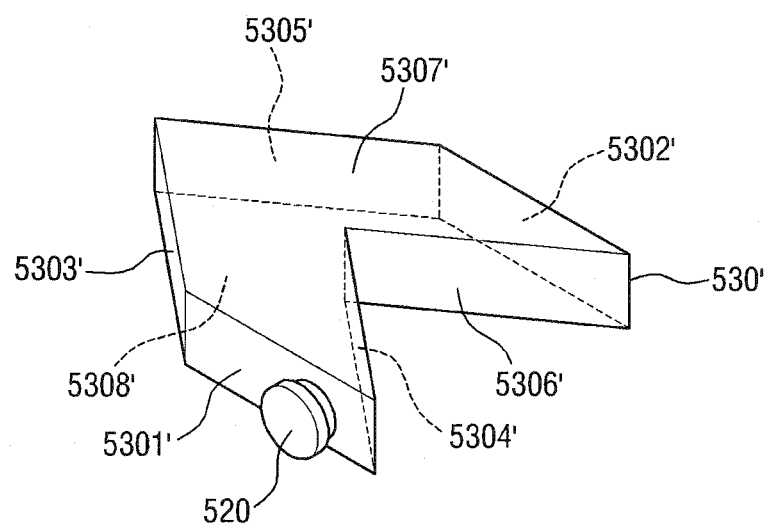
FIG. 6 is a perspective view of a light diffusion unit of the backlight unit of FIG. 5.

Referring to FIGS. 4 to 6, a light diffusion member 530' may be configured as an octahedron unit having a cross-section that corresponds to the shape of two rhomboids connected together, and include a light incident surface 5301', a light emission surface or output surface 5302' that is substantially parallel to the light incident surface 5301', a first surface 5303' and a second surface 5304' connected in a first direction at a predetermined angle with the light incident surface 5301', a third surface 5305' and a fourth surface 5306' connected in the first direction at a predetermined angle with the light emission surface 5302', and a fifth surface 5307' and a sixth surface 5308' that connect the light incident surface 5301', the light emission surface 5302', and the first to fourth surfaces 5303', 5304', 5305', and 5306'. The first surface 5303' and the second surface 5304' meet the third surface 5305' and the fourth surface 5306', respectively. In this case, the angle formed between the first and second surfaces 5303' and 5304' and the light incident surface 5301' and the angle formed between the third and fourth surfaces 5305' and 5306' and the light emission surface 5302' are not specially limited so far as the angles are in a range in which they make light reflected toward the light emission surface 5302' while changing a light path in the light diffusion member 530'. In an exemplary embodiment, the angles may be in the range of about 30° to about 60°. In another exemplary embodiment, the angle formed between the first and second surfaces 5303' and 5304' and the light incident surface 5301' and the angle formed between the third and fourth surfaces 5305' and 5306' and the light emission surface 5302' may be equal to each other.

Other surfaces, except for the light incident surface 5301' and the light emission surface 5302', may be reflection surfaces formed by reflection portions or reflectors 534. Through the surfaces, the light is reflected in the light diffusion member 530', and a path that passes through light diffusion portion 533 is lengthened to improve diffusion effects.

Further, the reflection portions 534, which are positioned on the surfaces that are adjacent to each other, may be shared by two adjacent units.

In this case, the internal light path is increased in comparison to the light diffusion member 530 of FIG. 2, and thus although the distance between the light incident surface 5301 and the light emission surface 5302 of the light diffusion member 530 becomes equal to the distance between the light incident surface 5301' and the light emission surface 5302' of the light diffusion member 530', the internal path of the light diffusion member 530' becomes about twice the internal path of the light diffusion member 530 to further improve the light diffusion effect.

For convenience in explanation, the same reference numerals are used for the elements that are substantially the same as the elements in the drawings as described above, and the duplicate explanation thereof will be omitted.

Figure 7:
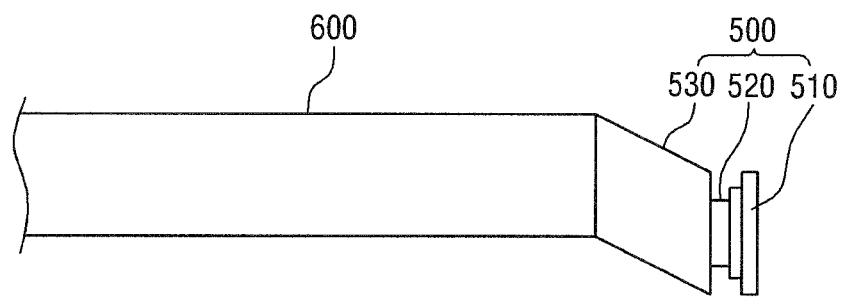
FIGS. 7 and 8 are a cross-sectional view and a perspective view of a modified example of the display device of FIG. 1.
Figure 8:
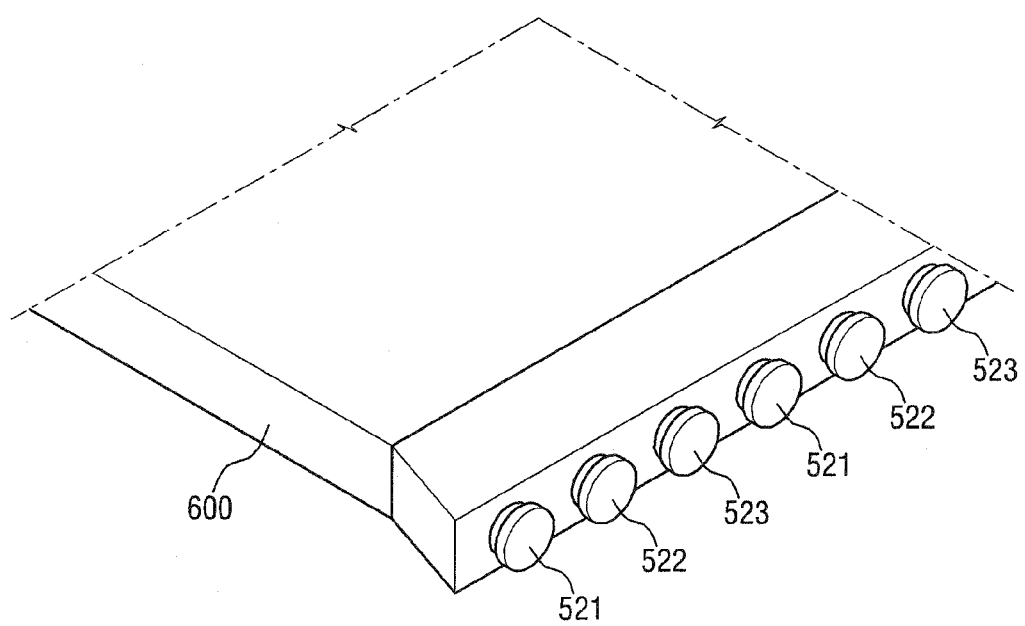

FIGS. 7 and 8 are a cross-sectional view and a perspective view of a modified example of the display device of FIG. 1.

Referring to the drawings, the light diffusion member 530 is arranged to form an inclination in upper/lower direction. That is, upper surfaces 5305 and lower surfaces 5306 of adjacent light diffusion units are connected to come in contact with each other.

In this case, the dead space that may occur on the side surface of the display device is removed, and a space formed on the lower surface of the light guide panel 600 may be used as an accommodation space of the reflection plate (not illustrated).

Hereinafter, the duplicate explanation of the contents as described above with reference to the above-described drawings will be omitted.

Figure 9:
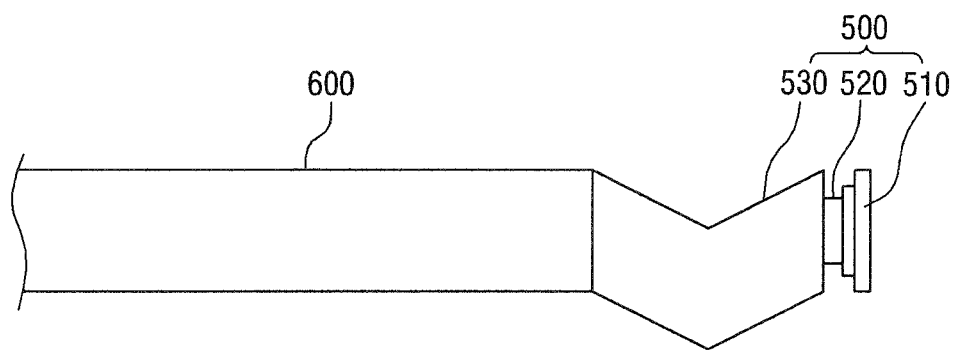
FIGS. 9 and 10 are a cross-sectional view and a perspective view of a modified example of the display device of FIG. 4.
Figure 10:
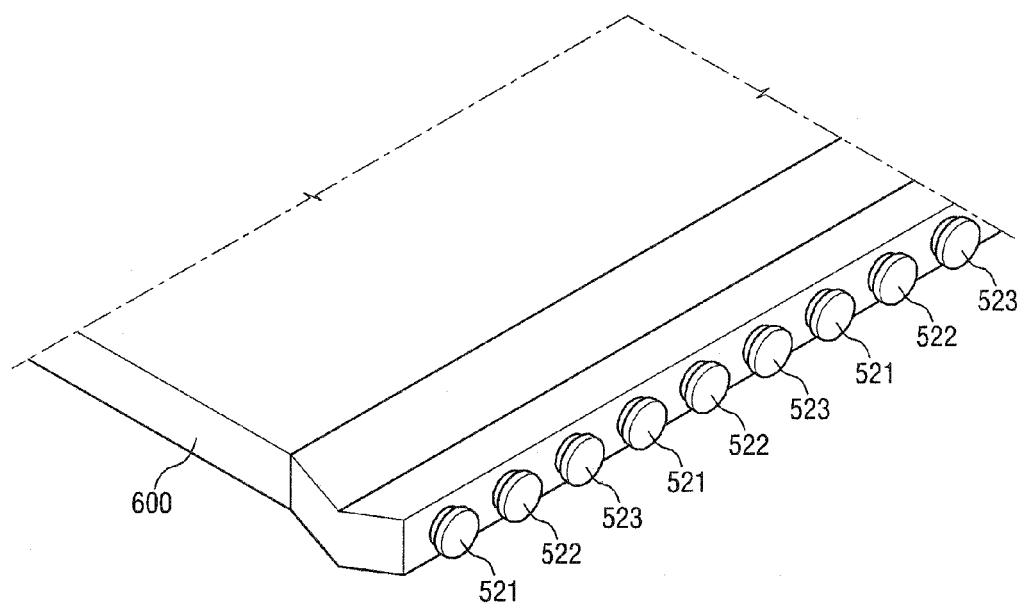

FIGS. 9 and 10 are a cross-sectional view and a perspective view of a modified example of the display device of FIG. 4.

In the illustrated embodiments, the light diffusion member 530' is arranged to form an inclination in upper/lower direction. That is, fifth surfaces 5307' and sixth surfaces 5308' of adjacent light diffusion units are connected to come in contact with each other.

In this case, the dead space that may occur on the side surface of the display device is removed, and a space formed on the lower surface of the light guide panel 600 may be used as an accommodation space of the reflection plate (not illustrated).

Hereinafter, the duplicate explanation of the contents as described above with reference to the above-described drawings will be omitted.

Figure 11:
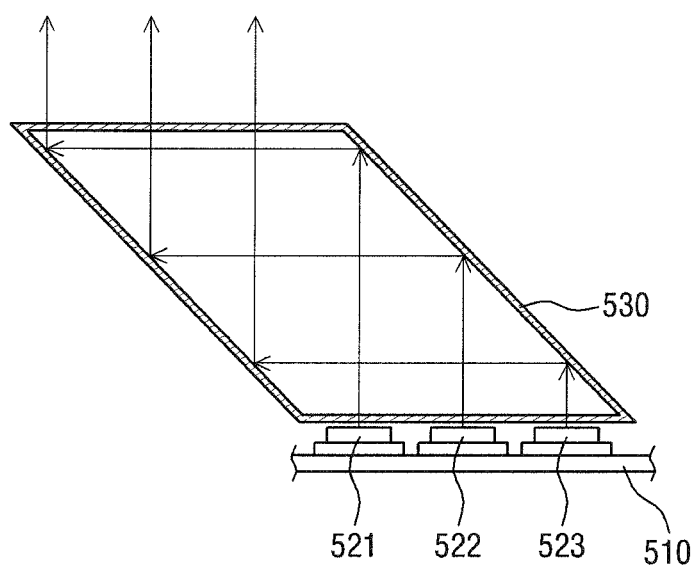
FIG. 11 is a cross-sectional view of a modified example of the backlight unit of FIG. 2.
Figure 12:
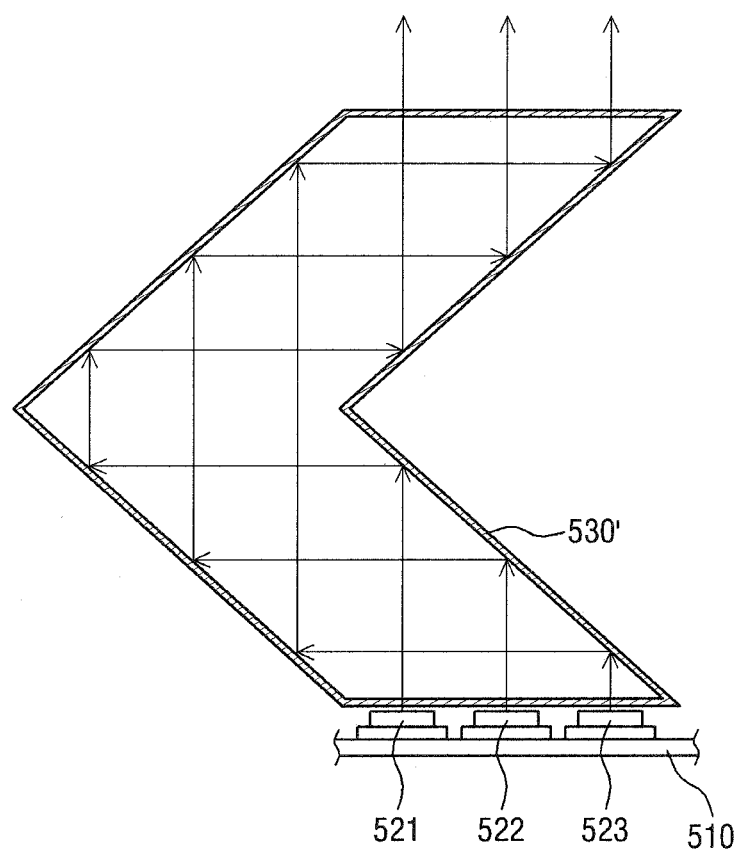
FIG. 12 is a cross-sectional view of a modified example of the backlight unit of FIG. 5.

FIG. 11 is a cross-sectional view of a modified example of the backlight unit of FIG. 2, and FIG. 12 is a cross-sectional view of a modified example of the backlight unit of FIG. 5.

Referring to these drawings together with the above-described drawings, a plurality of light sources 521, 522, and 523 may correspond to one light diffusion unit.

In an exemplary embodiment, the light sources may include a red light source 521, a green light source 522, and a blue light source 523. In the case of combining the three primary colors of light, they may be mixed on the light emission surface 5302 and 5302' and thus white light may be emitted.

In another exemplary embodiment, the respective light sources may be may be light sources 521, 522, and 523 having different wavelength bands in the same color region. In this case, the three primary colors of the light may be combined through the adjacent units.

Hereinafter, the duplicate explanation of the contents as described above with reference to the above-described drawings will be omitted.

Figure 13:
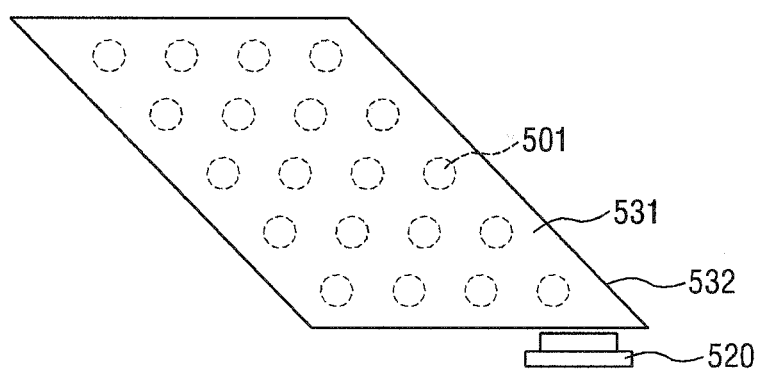
FIG. 13 is a cross-sectional view of a modified example in which the backlight unit of FIG. 2 includes a wavelength conversion member.
Figure 14:
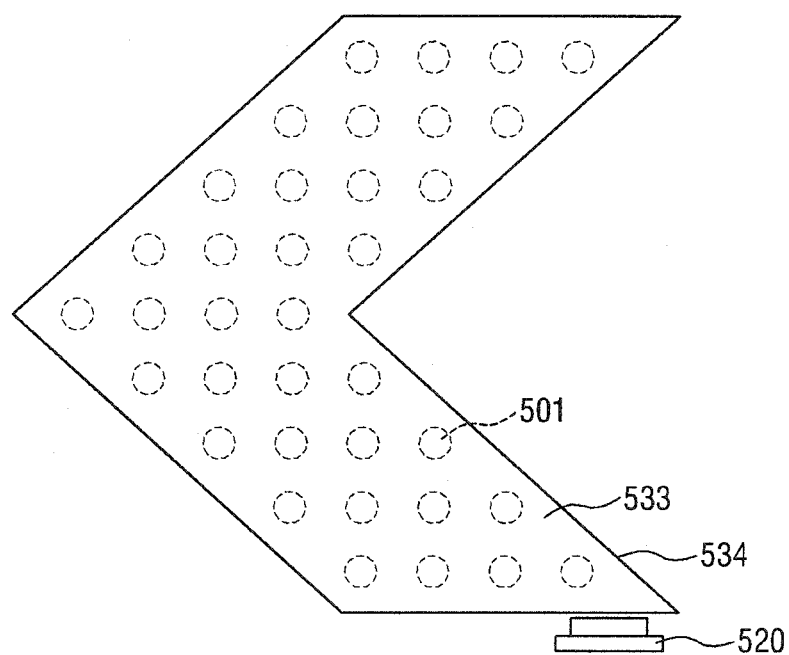
FIG. 14 is a cross-sectional view of a modified example in which the backlight unit of FIG. 5 includes a wavelength conversion member.

FIG. 13 is a cross-sectional view of a modified example in which the backlight unit of FIG. 2 includes a wavelength conversion member, and FIG. 14 is a cross-sectional view of a modified example in which the backlight unit of FIG. 5 includes a wavelength conversion member.

Referring to these drawings together with FIGS. 2, 3, 5, and 6, the light diffusion member 530 and 530' includes a wavelength conversion member 501 in the light diffusion portion 531 and 533.

The wavelength conversion member 501 may include phosphors, quantum dots, or a combination thereof.

The phosphor may be general organic or inorganic phosphors. In an exemplary embodiment, the phosphors may be yellow, green, and blue phosphors. For example, the yellow phosphors may be YAG phosphors, such as, $(Y_{1-x-y}Gd_xCe_y)_3Al_5O_{12}$, $(Y_{1-x}Ce_x)_3Al_5O_{12}$, $(Y_{1-x}Ce_x)_3(Al_{1-y}Ga_y)_5O_{12}$, and $(Y_{1-x-y}Gd_xCe_y)_3(Al_{1-z}Ga_z)_5O_{12}$, silicate phosphors, such as $(Sr,Ca,Ba,Mg)_2SiO_4$:Eu, or oxynitride phosphors, such as $(Ca,Sr)Si_2N_2O_2$:Eu. The green phosphors may be $Y_3(Al,Ga)_5O_{12}$:Ce, $CaSc_2O_4$:Ce, $Ca_3(Sc,Mg)_2Si_3O_{12}$:Ce, $(Sr,Ba)_2SiO_4$:Eu, $(Si,Al)_6(O,N)_8$:Eu(β-sialon), $(Ba,Sr)_3Si_6O_{12}N_2$:Eu, $SrGa_2S_4$:Eu, and $BaMgAl_{10}O_{17}$:Eu,Mn. The red phosphors may be $(Ca,Sr,Ba)_2Si_5(N,O)_8$:Eu, $(Ca,Sr,Ba)Si(N,O)_2$:Eu, $(Ca,Sr,Ba)AlSi(N,O)_8$:Eu, $(Sr,Ba)_3SiO_5$:Eu, $(Ca,Sr)S$:Eu, and $(La,Y)_2O_2S$:Eu, $K_2SiF_6$:Mn. However, the kinds of phosphors are not limited thereto.

The quantum dots mean semiconductor nano-particles having sizes of several to several tens of nm, and has the characteristics that emitted light differs depending on the sizes of the particles by a quantum quanfinement effect. More specifically, the quantum dots generate strong light in a narrow wavelength range, and the light emitted from the quantum dots is generated as unstable (unsteady) electrons come down from a conduction band to a valence band. In this case, the quantum dots have properties that they generate light of shorter wavelength as their particles become smaller, while they generate light of longer wavelength as their particles become larger. Accordingly, through adjustment of the size of the quantum dots, visible light of a desired wavelength can be output without exception.

In embodiments, the quantum dots may include any one of Si nanocrystal, II-IV group compound semiconductor nanocrystal, III-V group compound semiconductor nanocrystal, IV-VI group compound semiconductor nanocrystal, and a mixture thereof.

The II-VI group compound semiconductor nanocrystal may be any one selected from the group including CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

Further, the III-V group compound semiconductor nano crystal may be any one selected from the group including GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs, and the IV-VI group compound semiconductor nanocrystal may be SbTe.

Since the quantum dots generate light of shorter wavelength as their particles become smaller, and generate light of longer wavelength as their particles become larger, the particle sizes may be adjusted to be 55 to 65 Å in order to generate the red light, 40 to 50 Å in order to generate the green light, and 20 to 35 Å in order to generate the blue light.

The plurality of wavelength conversion members 501 may include one kind of quantum dots. For example, the plurality of wavelength conversion members 501 may include yellow quantum dots that convert the wavelength of the incident light into the wavelength of yellow light, but are not limited thereto. The plurality of wavelength conversion members 501 may include at least two kinds of quantum dots. For example, the plurality of wavelength conversion members 501 may include red quantum dots that convert the wavelength of the incident light into the wavelength of red light and green quantum dots that convert the wavelength of the incident light into the wavelength of green light.

The plurality of wavelength conversion members 501 may include one or more kinds of phosphors, and according to circumstances, may include one or more phosphors and one or more quantum dots.

The wavelength conversion members 501 may be dispersed in a state where they are naturally coordinated with the light diffusion portion 531 and 533 that is a dispersive medium.

In this case, the light sources 520 may emit blue light. In an exemplary embodiment, the light sources 520 may be blue light emitting diodes or blue laser diodes that include gallium nitride semiconductors, but are not limited thereto. The light sources 520 may mean all devices that can emit blue light.

Figure 15:
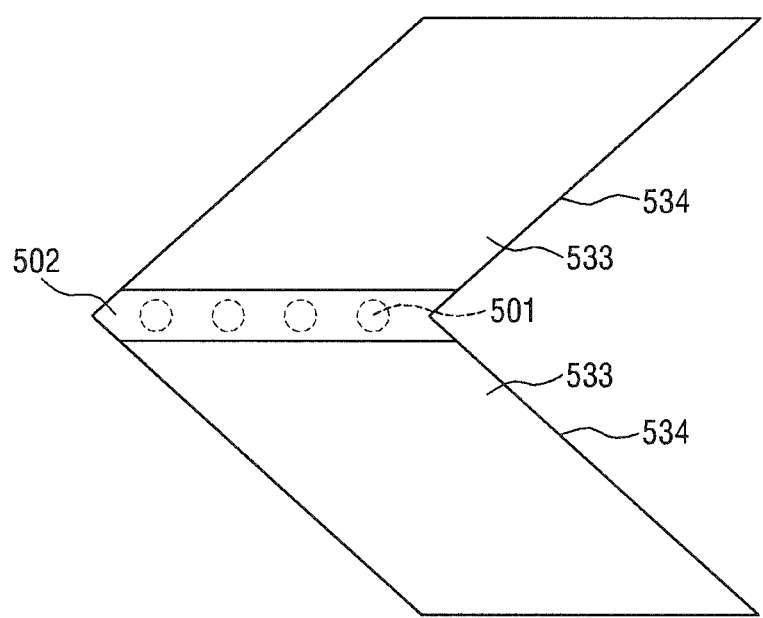
FIG. 15 is a cross-sectional view of a modified example in which the backlight unit of FIG. 5 includes a wavelength conversion layer.

FIG. 15 is a cross-sectional view of a modified example in which the backlight unit of FIG. 5 includes a wavelength conversion layer.

Referring to FIG. 15, a light diffusion member 530' may include a wavelength conversion layer 502 therein. The wavelength conversion layer 502 includes the above-described wavelength conversion member 501 therein.

The wavelength conversion layer 502 may further include a dispersive medium that disperses the wavelength conversion member 501. That is, the wavelength conversion member 501 may be dispersed in a state where it is naturally coordinated with the dispersive medium, such as an organic solvent or polymer resin. The dispersive medium may be any transparent material which does not exert an influence on the wavelength conversion performance of the phosphors or quantum dots, does not reflect the light, and does not absorb the light.

The organic solvent may include, for example, at least one of toluene, chloroform, and ethanol, and the polymer resin may include, for example, at least one of epoxy, silicone, polystyrene, and acrylate.

Further, the plurality of wavelength conversion layers 502 may further include a UV initiator, thermosetting additives, a crosslinker, a diffuser, and a combination thereof in addition to the dispersive medium. As described above, the wavelength conversion layers 502 may be positioned inside the light diffusion member 530' in a state where the wavelength conversion member 501 and the additives are mixed.

Figure 16:
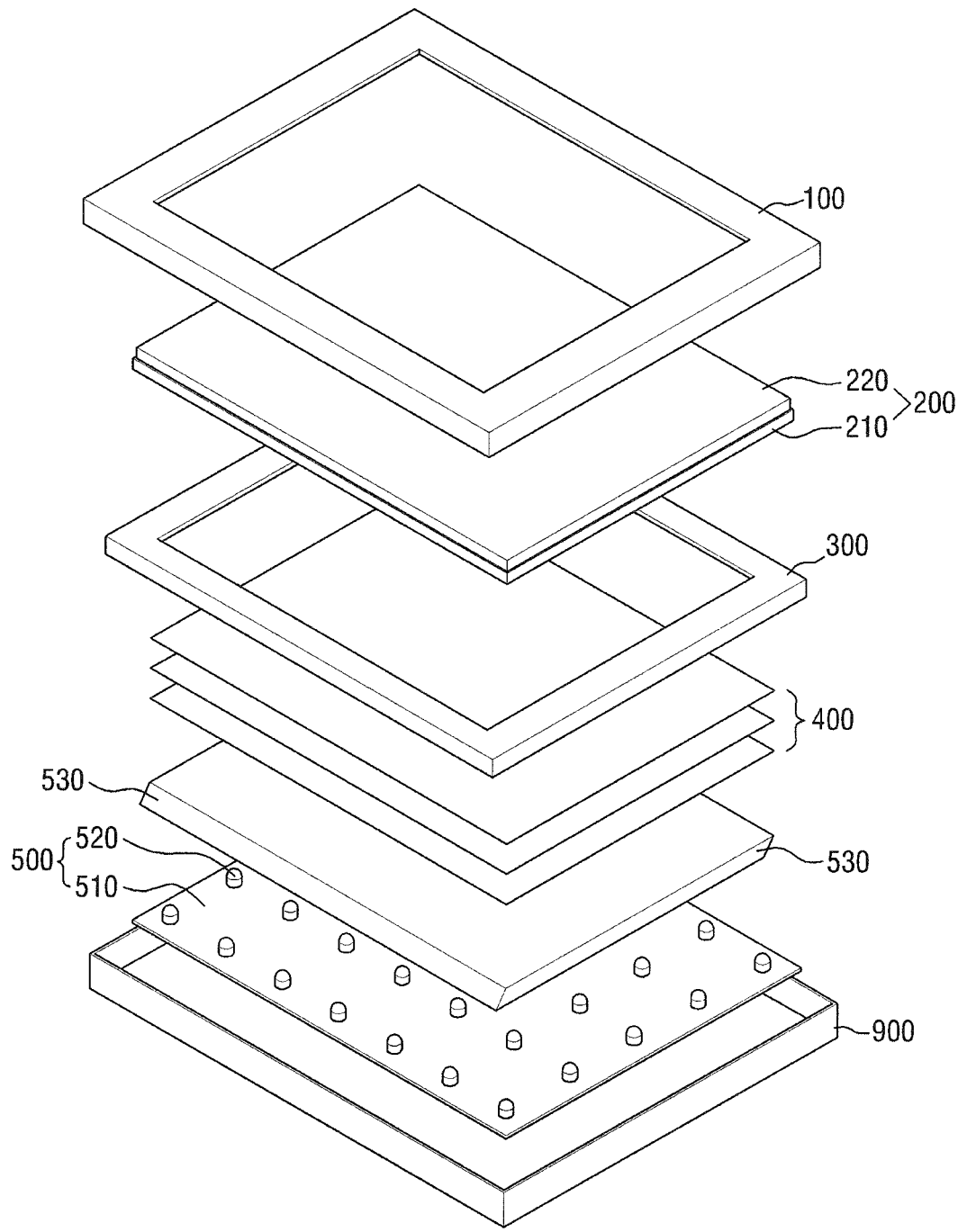
FIG. 16 is an exploded perspective view of a display device according to still another embodiment of the present invention.
Figure 17:
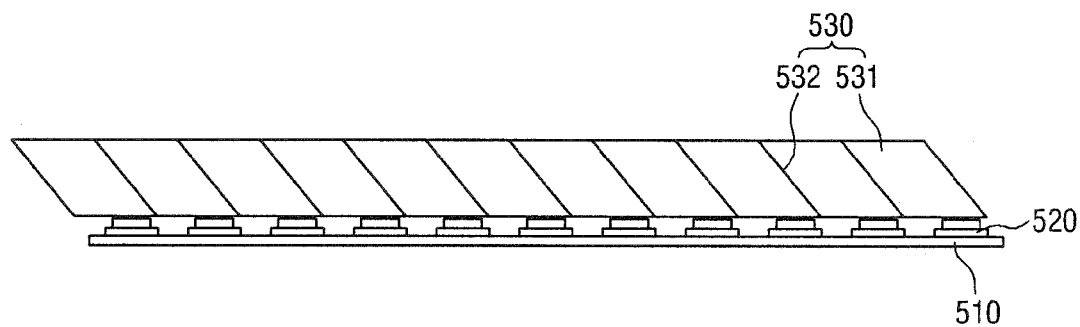
FIG. 17 is a vertical cross-sectional view of a backlight unit of the display device of FIG. 16.

FIG. 16 is an exploded perspective view of a display device according to still another embodiment of the present invention, and FIG. 17 is a vertical cross-sectional view of a backlight unit of the display device of FIG. 16.

Referring to the drawings, light sources 520 and diffusion member 530 of a backlight device may be arranged under a display panel 200. The backlight device may provide light to the display panel. The backlight device according to an embodiment of the present invention include a light source portion 510 and 520 and a light diffusion member 530.

The light source portion 510 and 520 may be positioned to overlap one surface of the display panel 200 when viewed in a direction perpendicular to a display surface. Specifically, the backlight device according to an embodiment of the present invention may be a direct-illumination type backlight device, and thus the light source portion 510 and 520 may be formed to overlap the display region of the display panel 200. The light source portion 510 and 520 may generate light that is provided to the display panel 200.

Here, the plurality of light sources may be positioned on the same plane, and the light diffusion member 530 may be positioned in the vertical direction to the plane on which the plurality of light sources 520 are positioned.

The plurality of light sources 520 may be arranged in a matrix form. In an exemplary embodiment, the light sources 520 of the adjacent rows or columns may be arranged to cross each other.

The duplicate explanation of the contents as described above with reference to the above-described drawings will be omitted.

Figure 18:
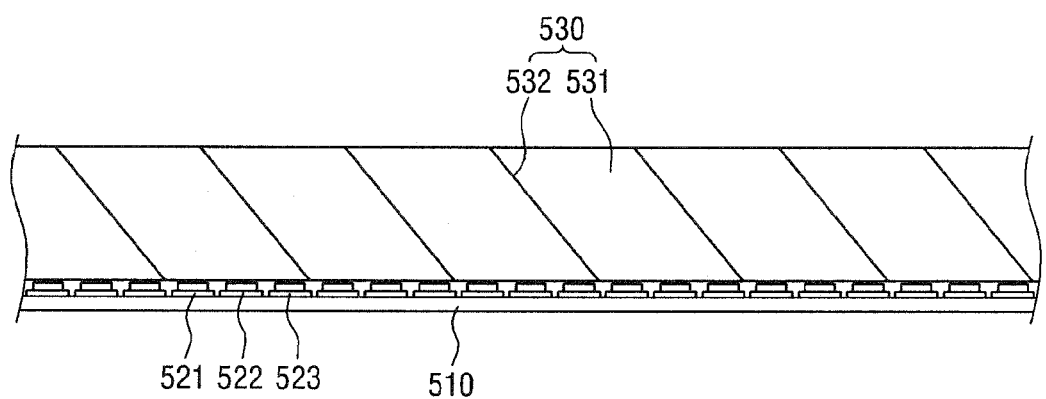
FIG. 18 is a vertical cross-sectional view of a modified example of the backlight unit of FIG. 17.
Figure 19:
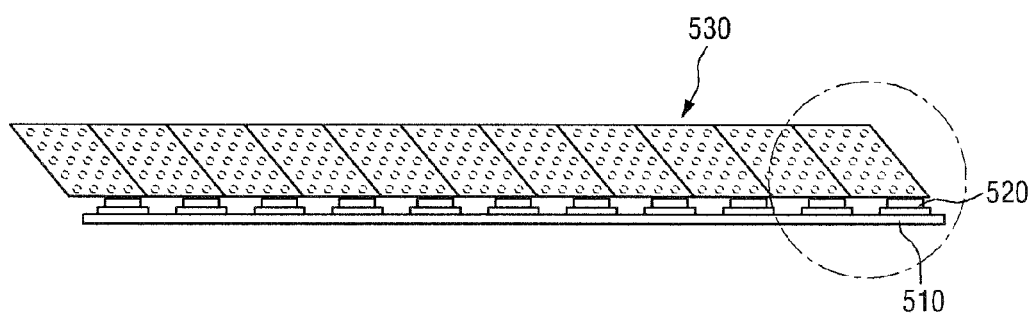
FIG. 19 is a vertical cross-sectional view of a modified example in which a light diffusion member of the backlight unit of FIG. 16 includes a wavelength conversion member.
Figure 20:
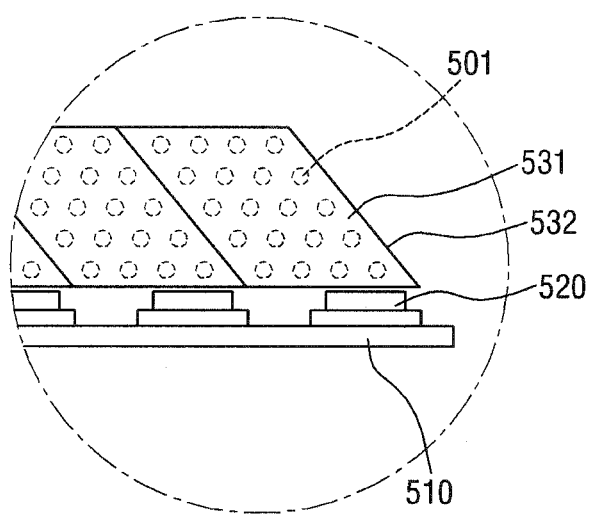
FIG. 20 is a partial enlarged view of FIG. 19.

FIG. 18 is a vertical cross-sectional view of a modified example of the backlight unit of FIG. 17, FIG. 19 is a vertical cross-sectional view of a modified example in which a light diffusion member of the backlight unit of FIG. 16 includes a wavelength conversion member, and FIG. 20 is a partial enlarged view of FIG. 19.

Referring to FIG. 18, a plurality of light sources 521, 522, and 523 may correspond to one light diffusion unit.

In an exemplary embodiment, the respective light sources may be a red light source 521, a green light source 522, and a blue light source 523. In the case of combining the three primary colors of light, they may be mixed on the light emission surface 5302 and thus white light may be emitted.

In another exemplary embodiment, the respective light sources may be may be light sources 521, 522, and 523 having different wavelength bands in the same color region. In this case, the three primary colors of the light may be combined through the adjacent units.

Hereinafter, the duplicate explanation of the contents as described above with reference to the above-described drawings will be omitted.

Referring to FIGS. 19 and 20, since the configuration illustrated in the drawings is the same as the configuration illustrated in FIG. 13 but only the types of backlight units are different from each other, the duplicate explanation thereof will be omitted.

Figure 21:
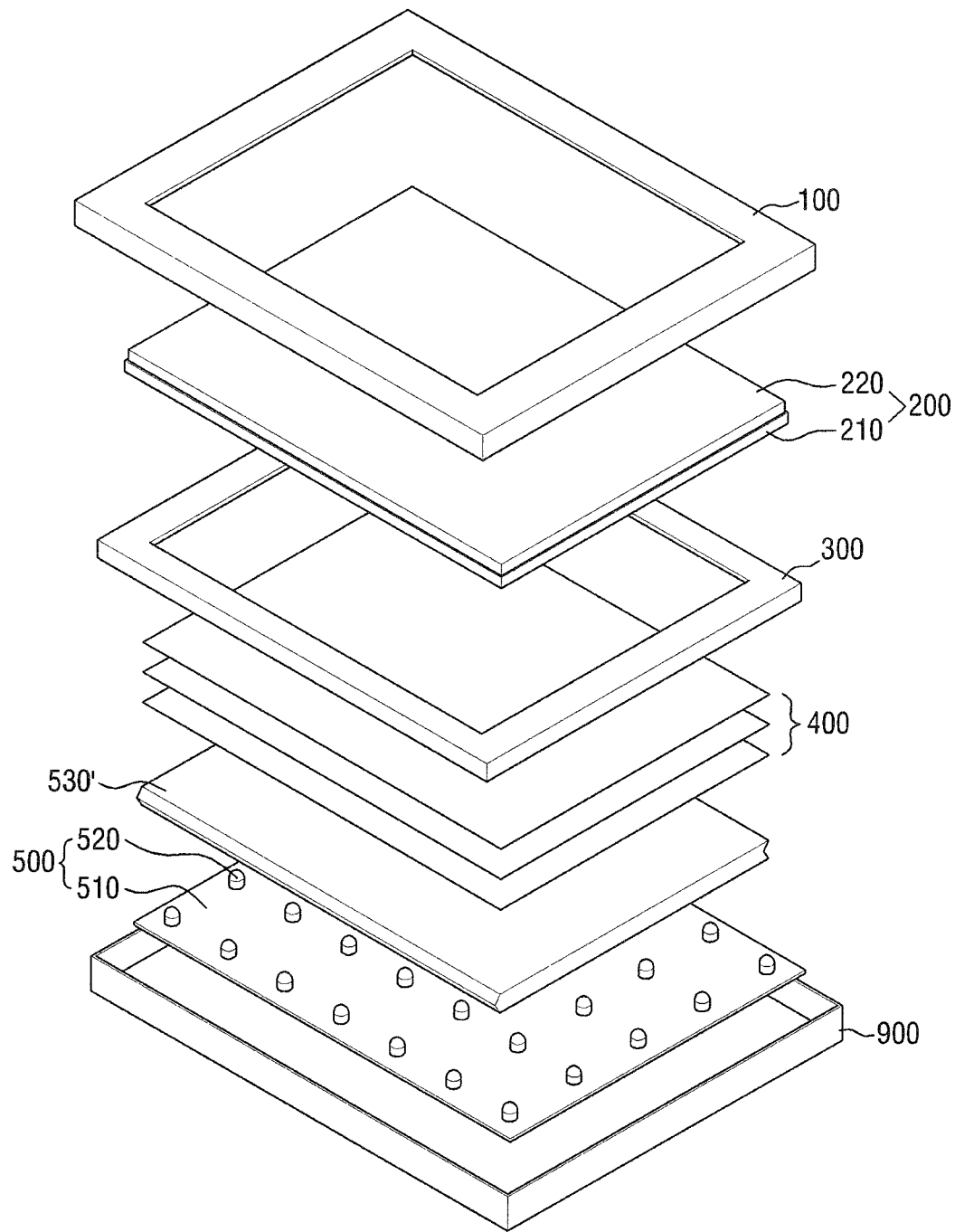
FIG. 21 is an exploded perspective view of a display device according to still another embodiment of the present invention.
Figure 22:
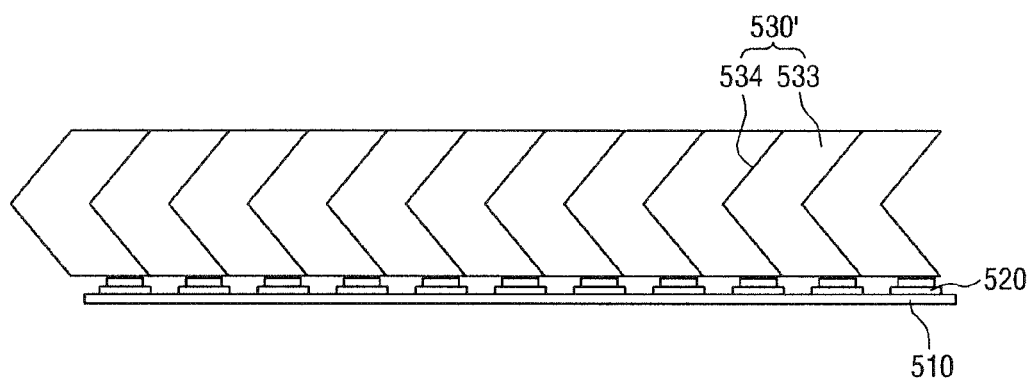
FIG. 22 is a vertical cross-sectional view of a backlight unit of the display device of FIG. 21.

FIG. 21 is an exploded perspective view of a display device according to still another embodiment of the present invention, and FIG. 22 is a vertical cross-sectional view of a backlight unit of the display device of FIG. 21.

The configuration illustrated in FIGS. 21 and 22 is the same as the configuration illustrated in FIGS. 16 and 17 except that the shape of the light diffusion member 530' is the same as that illustrated in FIGS. 5 and 6. Accordingly, the duplicate explanation thereof will be omitted.

Figure 23:
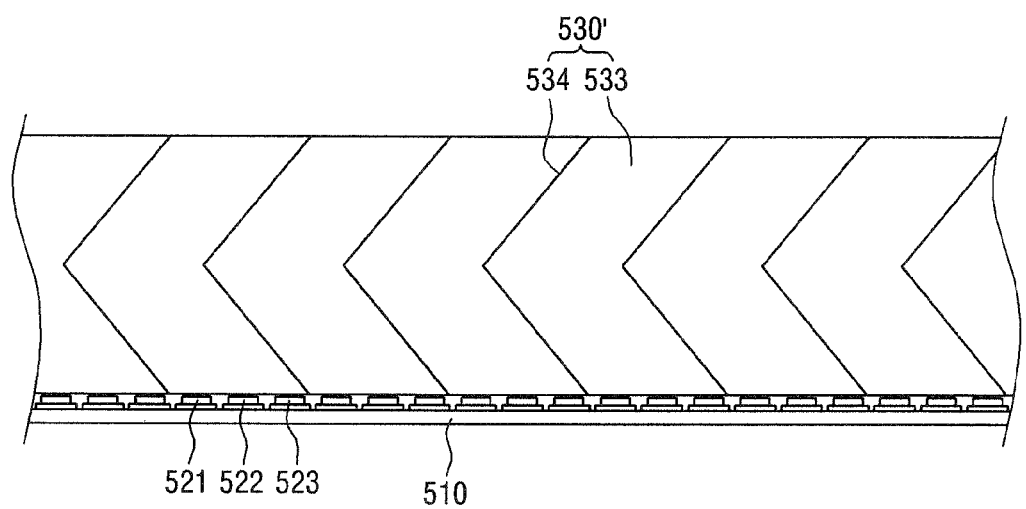
FIG. 23 is a vertical cross-sectional view of a modified example of the backlight unit of FIG. 22.
Figure 24:
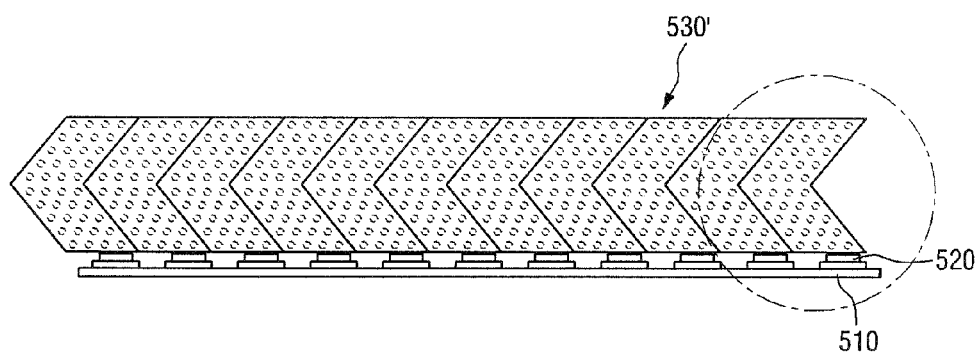
FIG. 24 is a vertical cross-sectional view of a modified example in which a light diffusion member of the backlight unit of FIG. 21 includes a wavelength conversion member.
Figure 25:
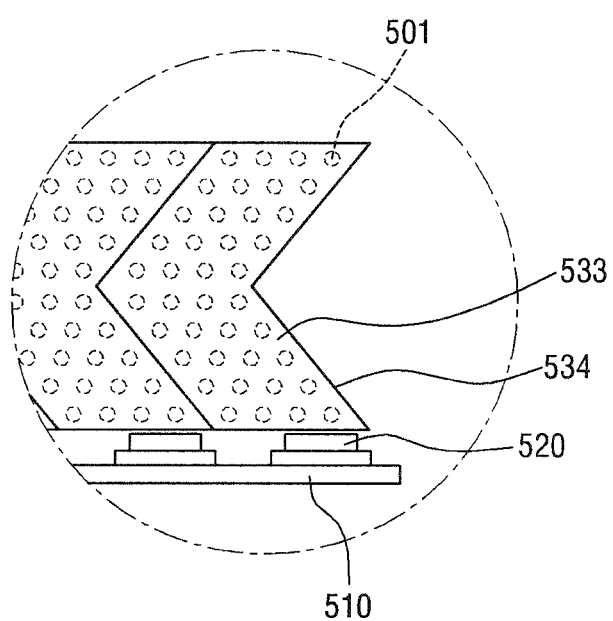
FIG. 25 is a partial enlarged view of FIG. 24.

FIG. 23 is a vertical cross-sectional view of a modified example of the backlight unit of FIG. 22, FIG. 24 is a vertical cross-sectional view of a modified example in which a light diffusion member of the backlight unit of FIG. 21 includes a wavelength conversion member, and FIG. 25 is a partial enlarged view of FIG. 24.

Figure 26:
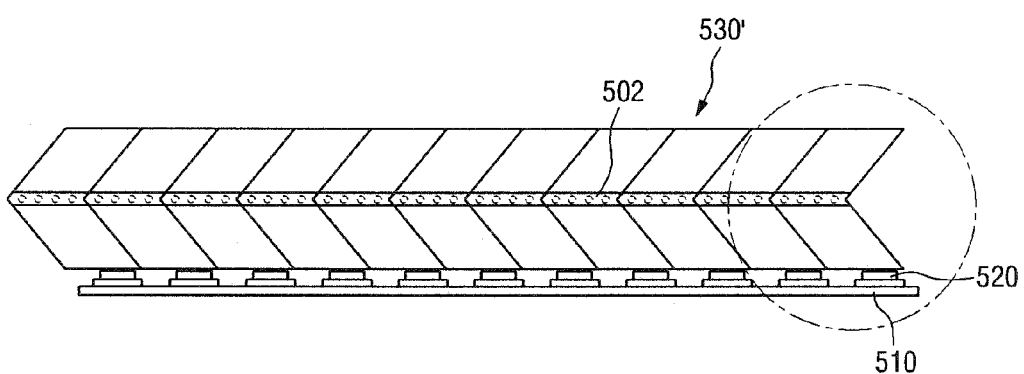
FIG. 26 is a vertical cross-sectional view of a modified example in which a light diffusion member of the backlight unit of FIG. 21 includes a wavelength conversion layer.
Figure 27:
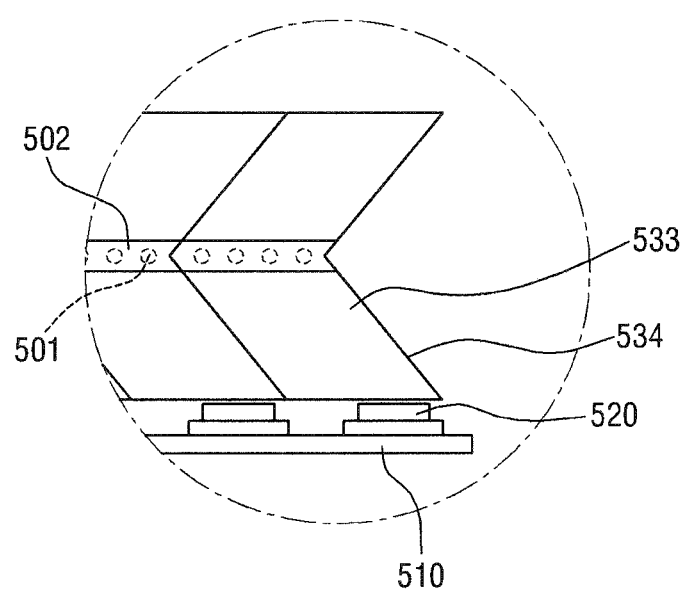
FIG. 27 is a partial enlarged view of FIG. 26.

Further, FIG. 26 is a vertical cross-sectional view of a modified example in which a light diffusion member of the backlight unit of FIG. 21 includes a wavelength conversion layer, and FIG. 27 is a partial enlarged view of FIG. 26.

Since the configuration illustrated in the drawings is substantially the same as that as described above with reference to FIGS. 12, 14 and 15 and is applied to a direct-illumination type backlight unit, the duplicate explanation thereof will be omitted.

In embodiments, as light beams emitted from a light source are reflected twice or more in the diffusion member, the light paths of the light beams become longer. As a result, the light beams from a light source may be scattered in the diffusion member even if the material of a matrix of the diffusion member is relatively light-transmissive or relatively transparent. Thus, in embodiments, the scattered light or diffused light can be obtained with minimization or reduction of loss in intensity of light.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A backlight unit comprising:
   a light source device comprising a plurality of light sources each of which is configured to emit light; and
   a light diffusion member positioned next to the light source device to diffuse or scatter the light emitted from the light source portion,
   wherein the light diffusion member comprises at least one reflector to change a light path of the light emitted from the light source device while the light passes through the light diffusion member,
   wherein the light diffusion member comprises a plurality of light diffusion units each of which comprises the at least one reflector, and
   wherein the light diffusion unit comprises a hexahedron shape having a rhomboid cross-section, and comprises a light incident surface and a light emission surface, wherein an acute angle formed on the rhomboid is in the range of about 30° to about 60°, wherein the light diffusion unit comprises four reflection surfaces provided by the at least one reflector.

2. The backlight unit of claim 1, wherein the light diffusion member comprises at least one selected from the group consisting of inorganic oxide, spun glass, mesh product, silk, gauze, and gelatin.

3. The backlight unit of claim 1, wherein the at least one reflector comprises at least one selected from the group consisting of a metal thin film, a Bragg mirror, and a reflection film.

4. The backlight unit of claim 1, wherein the at least one reflector comprises a first reflector shared by two adjacent light diffusion units among the plurality of light diffusion units.

5. The backlight unit of claim 1, wherein each light diffusion unit comprises a wavelength conversion member.

6. The backlight unit of claim 5, wherein the wavelength conversion member comprises at least one selected from the group consisting of a quantum dot and a phosphor.

7. The backlight unit of claim 5, wherein the wavelength conversion member comprises a quantum dot and a phosphor.

8. The backlight unit of claim 5, wherein the light diffusion unit comprises a wavelength conversion layer comprising the wavelength conversion member and positioned inside the light diffusion unit.

9. A display device comprising:
   a display panel configured to display an image; and
   the backlight unit of claim 1.

10. The display device of claim 9, wherein the light diffusion member comprises a plurality of light diffusion units each of which includes the at least one reflector.

11. The display device of claim 9, wherein the light diffusion member comprises a wavelength conversion member embedded therein.

12. A backlight device for use in a display device comprising:
- a light source device comprising a plurality of light sources spaced from each other, each of the plurality of light sources configured to emit light; and
- a light diffusion member comprising:
- a light transmission body comprising a light receiving surface facing a first one of the light sources for receiving the light emitted from the first light source and a light output surface facing away from the light receiving surface for outputting the light transmitted through the light transmission body, and
- a plurality of reflectors attached to the light transmission body and comprising first and second reflection surfaces oriented such that the light received from the first light source through the light receiving surface is reflected by the first and second reflection surfaces while the light passes through the light transmission body toward the light output surface,
- wherein an angle between any one of the light receiving and output surfaces and any one of the first and second reflection surfaces is about 30° to about 60°.

13. The backlight device of claim 12, further comprising a light guide plate comprising a side surface opposing the light output surface for receiving the light output from the light diffusion member, wherein the light diffusion member is located between the light source device and the light guide plate.

14. The backlight device of claim 12, wherein the plurality of light sources comprises a second light source immediately neighboring the first light source, wherein the light diffusion member comprises another light transmission body configured to transmit light emitted from the second light source, wherein the plurality of reflectors comprises a first reflector located between the light transmission body and the other light transmission body, and comprising the first reflection surface and a third reflection surface that are oriented such that the first reflection surface is configured to reflect the light emitted from the first light source and not to reflect the light emitted from the second light source, and that the third reflection surface is configured to reflect the light emitted from the second light source and not to reflect the light emitted from the first light source.

* * * * *